United States Patent
Champagne et al.

(10) Patent No.: US 10,767,327 B2
(45) Date of Patent: Sep. 8, 2020

(54) DRIVING SYSTEM FOR AT LEAST ONE AUGER, KIT AND METHOD FOR THE INSTALLATION OF SAME, AND SNOW REMOVAL DEVICE PROVIDED WITH SAME

(71) Applicant: LES MACHINERIES PRONOVOST INC., Saint-Tite (CA)

(72) Inventors: Christian Champagne, Saint-Tite (CA); Benoît Belleville, Saint-Tite (CA); Normand Beaulieu, Trois-Rivières (CA); Réjean Pronovost, Saint-Tite (CA)

(73) Assignee: LES MACHINERIES PRONOVOST INC., Saint-Tite, Quebec (CA)

( * ) Notice: Subject to any disclaimer, the term of this patent is extended or adjusted under 35 U.S.C. 154(b) by 0 days.

(21) Appl. No.: 15/934,441

(22) Filed: Mar. 23, 2018

(65) Prior Publication Data
US 2018/0274189 A1    Sep. 27, 2018

(30) Foreign Application Priority Data

Mar. 24, 2017   (CA) ...................................... 2961915

(51) Int. Cl.
*E01H 5/07*    (2006.01)
*E01H 5/04*    (2006.01)
(Continued)

(52) U.S. Cl.
CPC ............. *E01H 5/076* (2013.01); *E01H 5/045* (2013.01); *F16H 7/1209* (2013.01); *F16H 7/14* (2013.01); *F16H 2007/0844* (2013.01)

(58) Field of Classification Search
CPC ........... E01H 5/076; E01H 5/045; E01H 5/04; F16H 7/1209; F16H 7/14; F16H 2007/0844
See application file for complete search history.

(56) References Cited

U.S. PATENT DOCUMENTS

| | | | |
|---|---|---|---|
| 2,642,680 A * | 6/1953 | Curtis | ................. E01H 5/04 |
| | | | 193/16 |
| 3,303,588 A * | 2/1967 | Krause | ................. E01H 5/045 |
| | | | 37/250 |

(Continued)

*Primary Examiner* — Jamie L McGowan
(74) *Attorney, Agent, or Firm* — Thomas | Horstemeyer, LLP

(57) ABSTRACT

A driving system for driving at least one auger of a snow removing device comprising at least one at least one self-adjusting chain tensioner. A first portion of the driving system is positioned within an auger housing and a second portion of the driving system is positioned outside the auger housing. The roller chain is adapted to move across a third opening provided in the auger housing. The first portion is covered by a front guard to prevent snow or debris contained in the auger housing to contact said first portion. The front guard is provided with an opening adapted to surround a portion of a shaft element of the auger with a play between periphery of the opening and the periphery of a corresponding portion the shaft element. The play is either small enough to prevent water and or debris to enter the first casing, or filled with a filling element and/or covered with a sealing element secured to the front guard or the corresponding portion of the shaft element of the at least one auger, to have the play small enough to prevent water and/or debris to enter the first casing. The second portion prevent snow or debris present around the snow removing device to contact the said second portion. A snow blower provided with the driving system, a kit comprising parts and/or components of the driving system, a method for assembling the driving system, and a method for manufacturing some components or parts of the driving system.

12 Claims, 13 Drawing Sheets

(51) Int. Cl.
*F16H 7/14* (2006.01)
*F16H 7/12* (2006.01)
*F16H 7/08* (2006.01)

(56) References Cited

U.S. PATENT DOCUMENTS

| | | | | |
|---|---|---|---|---|
| 4,549,365 A * | 10/1985 | Johnson | ............... | E01H 5/098 |
| | | | | 192/13 R |
| 4,694,594 A * | 9/1987 | Thorud | ............... | E01H 5/04 |
| | | | | 37/244 |
| 4,897,942 A * | 2/1990 | Klas | ............... | E01H 5/04 |
| | | | | 37/244 |
| RE33,726 E * | 10/1991 | Thorud | ............... | E01H 5/04 |
| | | | | 37/233 |
| 5,101,911 A * | 4/1992 | Lee | ............... | E01H 5/04 |
| | | | | 172/113 |
| 5,224,552 A * | 7/1993 | Lee | ............... | A01B 33/028 |
| | | | | 172/113 |
| 5,551,926 A | 9/1996 | Ebert | | |
| 6,488,602 B1 | 12/2002 | Ebert | | |
| 7,540,102 B2 * | 6/2009 | Olmr | ............... | E01H 5/04 |
| | | | | 37/245 |
| 9,708,782 B2 * | 7/2017 | Houle | ............... | E01H 5/045 |
| 2002/0170209 A1 * | 11/2002 | Ruebusch | ............... | E01H 5/04 |
| | | | | 37/252 |
| 2002/0189137 A1 * | 12/2002 | Cox | ............... | A01D 34/69 |
| | | | | 37/242 |
| 2005/0180259 A1 * | 8/2005 | Crall | ............... | B01F 7/086 |
| | | | | 366/331 |
| 2012/0180346 A1 * | 7/2012 | Gerrits | ............... | E01H 5/045 |
| | | | | 37/251 |

* cited by examiner

US 10,767,327 B2

DRIVING SYSTEM FOR AT LEAST ONE AUGER, KIT AND METHOD FOR THE INSTALLATION OF SAME, AND SNOW REMOVAL DEVICE PROVIDED WITH SAME

CROSS REFERENCE TO A RELATED APPLICATION

The present patent application claims the priority of Canadian patent application no. 2 961 915 filed on Mar. 24, 2017, the content of which is incorporated herein in its entirety.

FIELD OF THE INVENTION

The present invention relates to the field of snow removal devices. More particularly, the present invention relates to a new driving system for driving at least one auger of a snow removal devices, and also relates to a snow removal device provided with such a driving system. Also, the invention relates to a kit and a method for the installation of the new driving system on a snow removal device. Also, the invention relates to a method for the manufacture of components and/or parts of the driving system. Preferably, the snow removal devices may be a snow thrower or a snow blower, preferably a snow blower.

BACKGROUND

Snow blowers are well known in the art. They may be intended for domestic, commercial or industrial uses (see FIG. 1). Also, they may be of reverse type (see FIG. 2), and/or provided with an integrated blade (see FIG. 3), etc. Also, they may be used on a carrying vehicle (e.g. a farm tractor, see FIG. 4), an articulated loader (see FIG. 5), or on a compact motorized vehicle (see FIG. 6), provided with a three-points hitch 1, with a quick hitch 2 or any other type of hitches well known to a skilled workman, providing power to the snow blower via a transmission shaft 3 (e.g. connected to a PTO shaft), a hydraulic power 4, etc.

A roller chain 19 is generally used as an element for the transmission of power (see FIG. 7) between a side shaft 5 of the gear box 6 and the auger 7 of the snow blower 8. Important advantages of the roller chain 19 are its resistance to impact, mounting flexibility, and configuration tolerance.

It is well known in the art that to preserve the useful life of the roller chain 19, the roller chain must be well lubricated, kept under a perfect tension and prevented to be exposed to debris and/or contaminants (e.g. water, salts, sands, etc.). However, these requirements are difficult to obtain with existing snow removal devices, especially snow blowers.

Indeed, as illustrated in FIGS. 11 and 12, as an example, various styles of guards such as a front guard having a first part 12 and a second part 13, used with existing snow blowers, still allow some contaminants, such as powder snow, to pass through slots 32 and 51 and eventually some various larger openings of the guards. Contaminants according to the existing art, are evacuated by the rear guard 52, by the roller chain 19 projecting outside the contaminants. Also, with reference to FIG. 7, other contaminants (e.g. salts, sands, water, etc.) projected by the wheels 54 of the carrying vehicle while circulating on a road, may gather in the area 53 of the roller chain tensioner to thereby contaminate the same.

One of the biggest problem to be solved by the man skilled in the art is the adjustment of the tension of the roller chain 19. This tension is required to be sufficient to keep the rollers of the roller chain applied against the bottom of the teeth of the output gear 20 and the driving gear 21, to prevent a premature wear of the teeth and/or the roller chain. Also, the tension applied does not have to be excessive in order to prevent a premature elongation of the roller chain and a lost of energy.

An elongation of the roller chain 19 is a normal consequence of the use of the roller chain. However by limiting this elongation, the maintenance steps are reduced and the useful life of the roller chain, output gear and driving gear is increased. Also, when the tensioning of the roller chain is too high, the noise generated by the movement of the roller chain on the output gear and the driving gear, increases to thereby cause an irritant to the snow blower operator and nearby residents during snow removal operations.

Various systems have been developed and are still in use for applying a tension to the roller chain of a snow blower, such as a single tensioning sprocket wheel 27 (see FIG. 8), a pair of tensioning sprocket wheels 28 (see FIG. 9) mounted in tandem with a spring 22, and, in certain case, a fixed sprocket wheel 9 (see FIG. 10) can be used to deviate the roller chain of various obstacles.

FIG. 8 illustrates a simple system representing the single tensioning sprocket wheel 27 which shows the advantage of being economical. However, this simple system because of its fixed mounting, has the inconvenient that its adjustment must be made with tools. Also, this simple system does not continuously apply a tension on the roller chain. Thus, the roller chain, when worn and elongated, becomes loose and as long as the operator does not readjust the single tensioning sprocket wheel 27, the roller chain 19, the output gear 20 and the driving gear 21 will become worn quickly because the rollers are not properly applied at the bottom of teeth of the output gear 20 and the driving gear 21.

FIG. 9 illustrates the pair of tensioning sprocket wheels 28 mounted in tandem with a spring 22 which has the advantage of self-tensioning the roller chain 19 in part. However, some manual readjustments will need to be made from time to time. The advantage of this system is that the roller chain 19 is always under tension and keeps an ideal contact with the output gear 20 and the driving gear 21. The inconvenient is that the spring 22 applies an additional force on the roller chain. This additional force varies depending the compression of the spring, and this contributes to the elongation of the roller chain and/or generates additional noise, especially when the spring 22 is at its maximal adjustment position. The roller chain 19 is also be subjected to move into two opposite directions on the sprockets wheels 28 of the tensioner to thereby create an additional premature wear of the roller chain 19. Also, this system comprises several mobile parts that can be worn and consequently necessitate additional lubrication. This high number of mobile parts is hard to be perfectly aligned along the path of the roller chain, and consequently may further generates an additional risk of component damages.

FIG. 29 illustrates a tensioning system 29 for roller chain 19 that is well known to skilled workman under the trademark «Roll-Ring» and various patents such as U.S. Pat. Nos. 5,551,926 or 6,488,602 B1. Such a system is used in various industrial environment. However, it has never been used in a driving system for driving at least one auger of a snow removal device (such as a snow blower) for various reasons. This system has the advantage of applying a delicate and constant tension on the roller chain to thereby limit the level of noise and the elongation of the roller chain. However, this system is fragile and subjected to derailing when used in an environment containing contaminants. Because the «Roll Ring» 29 does not have fixation means other than the engagement of its teeth in the roller chain 19, any presence of objects or debris between the «Roll Ring» 29 and the roller chain 19 may cause a derailment of the «Roll Ring» 29.

It is known that when operating a snow blower a plurality of debris (snow, ice, etc.) are generated and may be inserted in the environment of the roller chain. More particularly, powder snow can infiltrate in the environment of the roller chain via the slots 32 and/or 51 as illustrated in FIG. 12 and create a gathering inside the parts 12 and 13 of the front guards, and powder snow may eventually solidify or even turn into ice as a result of temperature changes. All those debris, when detaching, may move in the environment of the «Roll Ring» 29 and, of course, may cause the derailing of the «Roll Ring» 29.

Therefore, there is a strong need for a solution allowing to overcome the above-mentioned problems/inconveniences.

Also, there is a strong need for a driving system that overcome at least in part the above-mentioned problems/inconveniences.

Also, there is a strong need for a snow removal device provided with such a driving system, that overcome at least in part the above-mentioned problems/inconveniences.

Also, there is a strong need for a kit and a method for the installation of the new driving system on a snow removal device, that overcome at least in part the above-mentioned problems/inconveniences.

Also, there is a strong need for a method for the manufacturing of components and/or parts of the above-mentioned driving system, that overcome at least in part the above-mentioned problems/inconveniences.

Indeed, in spite of the numerous improvements and discoveries over the years, there is still a strong need to continuously innovate and find better and/or different ways to commercialize snow blowers in a manner that is faster, simpler, more efficient, more economical, more reliable, more adjustable, more polyvalent, more adaptable, more durable, more conscientious of the environment, more washable, and/or improved.

SUMMARY OF THE INVENTION

An object of the invention relates to a driving system for an auger of a snow removal device (such as a snow blower or snow thrower, preferably a snow blower, comprising such a driving system), which thanks to its conception and modular components, satisfies with at least some of the above-mentioned needs, and consequently defines an improvement with respect to other snow blowers and/or related driving systems known in the art.

The above-mentioned object is achieved, as it will be better explained hereinafter, by a driving system for at least one auger of a snow blower (and/or a resulting blower comprising such a driving system) as briefly described in the present description, and as exemplified in the enclosed drawings.

As it will be better understood, in the light of the present description and drawings, the present invention relates to an original configuration of constitutive parts and/or components of a snow blower allowing to communicate the power originating from a gear box, etc.

Another aspect of the present invention relates to a snow blower provided with the above-mentioned driving system for driving at least one auger.

Another aspect of the present invention relates to a vehicle provides with the above-mentioned snow blower.

Another aspect of the present invention relates to a kit of components intended to be assembled to form the above-mentioned new driving system for driving at least one auger.

Another aspect of the present invention relates to a set of components adapted to interchange (e.g. to replace, to supply, etc.) with components of the above-mentioned set of components.

Another aspect of the present invention relates to a method for assembling the components of the above-mentioned set or kit.

Another aspect of the present invention relates to a method for the manufacture of any of the component making part of the above-mentioned driving system for driving at least one auger.

Another aspect of the present invention relates to a method for assembling the components of the above-mentioned driving system for driving at least one auger.

Another aspect of the present invention relates to a method for the operation of the above-mentioned driving system for driving at least one auger.

Another aspect of the present invention relates to a business method related with a driving system as defined hereinbefore, a snow blower as defined hereinbefore, a kit as defined hereinbefore, a set as defined hereinbefore, and/or any of the methods defined hereinbefore.

An embodiment of the invention relates to a driving system for driving at least one auger of a snow removing device, said snow removing device comprising:
  a frame
  an auger housing supported on the frame or being part of the frame, and comprising a first opening defining a front opening, a second opening defining a rear opening, a first lateral wall and a second lateral wall;
  an auger comprising a shaft element having opposite ends which are respectively rotatably supported by the first lateral wall and the second lateral wall;
  means adapted for attaching the frame to a vehicle; and
  the driving system for driving the at least one auger, said driving system for driving the at least one auger comprising
    at least one driving gear rotatably supported by the frame;
    at least one output gear mounted on the shaft element of the at least one auger, close one of the first lateral wall of the auger housing;
    a roller chain linking the at least one driving gear and the at least one output gear; and
    at least one means for tensioning the roller chain comprising at least one self-adjusting chain tensioner;
  wherein a first portion of the driving system for driving the at least one auger is positioned within the auger housing and a second portion of the driving system for driving the at least one auger is positioned outside the auger housing,
  wherein the roller chain is adapted to move across a third opening provided in the auger housing;
  wherein the first portion is covered by a front guard secured to the first lateral wall and forming with the first lateral wall a first casing adapted to prevent snow or debris contained in the auger housing to contact said first portion;
  wherein the front guard is provided with at least one opening adapted to surround a portion of the shaft element of the at least one auger with a play between periphery of the at least one opening and the periphery of a corresponding portion the corresponding shaft element, wherein the play is either small enough to prevent water and or debris to enter the first casing, or filled with a filling element and/or covered with a sealing element secured to the front guard or the corresponding portion of the shaft element of the at least one auger, to have the play small enough to prevent water and/or debris to enter the first casing; and wherein the second portion is covered by at least one rear guard forming a casing secured to the frame and/or the auger housing, and adapted to prevent snow or debris present around the snow removing device to contact the said second portion.

Another embodiment of the invention relates to the driving system defined hereinabove, wherein the snow removing device is a snow blower further provided with a blower unit comprising an impeller fan element positioned inside a blower housing, and rotatably supported by the blower housing; and a driving system for driving the impeller fan element.

Another embodiment of the invention relates to the driving system defined hereinabove, wherein the self-adjusting chain tensioner comprises at least one Roll-Ring® chain tensioner.

Another embodiment of the invention relates to the driving system defined hereinabove, wherein the at least one means for tensioning the roller chain further comprises a secondary chain tensioner.

Another embodiment of the invention relates to the driving system defined hereinabove, wherein the filing element comprises a two-part member adapted to be secured around the portion of the shaft element of the at least one auger that is intended to be positioned in the at least one opening of the front guard, wherein said filling element has a central opening configured to fit with the outer surface of the shaft element of the at least one auger, and has an outer periphery adapted to be housed in the at least one opening of the front guard; and wherein either a play between said outer surface and the periphery of the at least one opening of the guard cover, is small enough to prevent water and/or debris to enter the first casing, or the play is covered by at least one sealing element that reduce the play to a size small enough to prevent water and/or debris to enter the first casing.

Another embodiment of the invention relates to the driving system defined hereinabove, wherein the sealing element is made of flexible elastomeric material, and secured to the first guard. Preferably, the elastomeric material can be fastened to the first part and/or the second part by any appropriate fastening means, such as mechanical fasteners, adhesive, etc.

Another embodiment of the invention relates to the driving system defined hereinabove, wherein the front guard comprises:
a first part provided with a front edge having at least one first recess,
a second part provided with a rear edge having at least one second recess,
the at least one first recess and the at least one second recess forming, when the front edge and the rear edge are closed to each other, the at least one opening adapted to surround the shaft element of the at least one auger;

and wherein the front edge and the rear edge are close enough to define a play therebetween that is either small enough to prevent water and or debris to enter the first casing, or filled and/or covered with a sealing element secured to any one of the first part or the second part to have the play small enough to prevent water and/or debris to enter the first casing.

Another embodiment of the invention relates to the driving system defined hereinabove, wherein the sealing element between the first part and the second part is made of a flexible elastomeric material. Preferably, the elastomeric material can be fastened to the first part and/or the second part by any appropriate fastening means, such as mechanical fasteners, adhesive, etc.

Another embodiment of the invention relates to the driving system defined hereinabove, wherein the rear guard comprises at least two distinct parts, that is a main part and secondary part that can be removably fastened to the main part. Preferably, the secondary part is removably fastened to the main part with at least one two-part fastener, such as for example a two-part fastener comprising a tongue and a notch. More preferably, a plurality of two-part fasteners can be used. Additionally, at least one of the two-part fastener may be further provided with a lock system.

Another embodiment of the invention relates to a snow removing device comprising:
a frame
an auger housing supported on the frame and comprising a first opening defining a front opening, a second opening defining a rear opening, a first lateral wall and a second lateral wall;
at least one auger comprising a shaft element having opposite ends which are respectively rotatably supported by the first lateral wall and the second lateral wall;
and
a driving system for driving the at least one auger,
wherein said driving system for driving the auger is as defined hereinabove.

Another embodiment of the invention relates to snow removing device defined hereinabove, wherein the snow removing device is a snow blower further provided with a blower unit comprising an impeller fan element positioned inside a blower housing, and rotatably supported by the blower housing; and a driving system for driving the impeller fan element.

Another embodiment of the invention relates to the snow removing device defined hereinabove, wherein the self-adjusting chain tensioner comprises at least one Roll-Ring® chain tensioner.

Another embodiment of the invention relates to the snow removing device defined hereinabove, wherein the at least one means for tensioning the roller chain further comprises a secondary chain tensioner.

Another embodiment of the invention relates to the snow removing device defined hereinabove, wherein the filing element comprises a two-part member adapted to be secured around the portion of the shaft element of the at least one auger that is intended to be positioned in the at least one opening of the front guard, wherein said filling element has a central opening configured to fit an outer surface of the shaft element of the at least one auger, and an outer cylindrical periphery adapted to be housed in the at least one opening of the guard cover; and wherein either a play between said outer surface and the periphery of the at least one opening of the guard cover, is small enough to prevent water and/or debris to enter the first casing, or the play is covered by at least one sealing element that reduce the play to a size small enough to prevent water and/or debris to enter the first casing.

Another embodiment of the invention relates to the snow removing device defined hereinabove, wherein the sealing element is made of flexible elastomeric material, and secured to the front guard. Preferably, the elastomeric material can be fastened to the first part and/or the second part by any appropriate fastening means, such as mechanical fasteners, adhesive, etc.

Another embodiment of the invention relates to the snow removing device defined hereinabove, wherein the front cover comprises:
- a first part provided with a front edge having at least one first recess,
- a second part provided with a rear edge having at least one second recess,
- the at least one first recess and the at least one second recess forming, when the front edge and the rear edge are closed to each other, the at least one opening adapted to surround the shaft element of the at least one auger;
- and wherein the front edge and the rear edge are close enough to define a play therebetween that is either small enough to prevent water and or debris to enter the first casing, or filled with a filling element and/or covered with a sealing element secured to any one of the first part or the second part to have the play small enough to prevent water and/or debris to enter the first casing.

Another embodiment of the invention relates to the snow removing device defined hereinabove, wherein the sealing element between the first part and the second part is made of a flexible elastomeric material. Preferably, the elastomeric material can be fastened to the first part and/or the second part by any appropriate fastening means, such as mechanical fasteners, adhesive, etc.

Another embodiment of the invention relates to the snow removing device defined hereinabove, wherein the rear guard comprises at least two distinct parts, that is a main part and secondary part that can be removably fastened to the main part. Preferably, the secondary part is removably fastened to the main part with at least one two-part fastener, such as for example a two-part fastener comprising a tongue and a notch. More preferably, a plurality of two-part fasteners can be used. Additionally, at least one of the two-part fastener may be further provided with a lock system.

Another embodiment of the invention relates to a kit for the installation of a driving system as defined hereinabove, wherein said kit comprises:
- at least one driving gear adapted to be rotatably supported by the frame and/or the auger housing;
- at least one output gear adapted to be mounted on the shaft element of the at least one auger;
- a roller chain linking for the linking of the at least one driving gear and the at least one output gear; and
- at least one means for the tensioning the roller chain comprising at least one self-adjusting chain tensioner;
- a front guard adapted to be secured to the first lateral wall to form with the first lateral wall a first casing to prevent snow or debris contained in the auger housing to contact said first portion;
- a rear guard adapted to be secured to the frame and/or the auger housing to prevent snow or debris present around the snow removing device to contact the said second portion; and
- optionally a notice of instruction.

Another embodiment of the invention relates to the kit defined hereinabove, wherein the snow removing device is a snow blower further provided with a blower unit comprising an impeller fan element positioned inside a blower housing, and rotatably supported by the blower housing; and a driving system for driving the impeller fan element.

Another embodiment of the invention relates to the kit defined hereinabove, wherein the self-adjusting chain tensioner comprises at least one Roll-Ring® chain tensioner.

Another embodiment of the invention relates to the kit defined hereinabove, wherein the at least one means for the tensioning the roller chain further comprises a secondary chain tensioner.

Another embodiment of the invention relates to the kit defined hereinabove, further comprising a filling element comprising a two-part member adapted to be secured around the portion of the shaft element of the at least one auger that is intended to be positioned in the at least one opening of the front guard,
- wherein said filling element has a central opening configured to fit an outer surface of the shaft element of the at least one auger, and an outer cylindrical periphery adapted to be housed in the at least one opening of the guard cover; and
- wherein either a play between said outer surface and the periphery of the at least one opening of the guard cover, is small enough to prevent water and/or debris to enter the first casing, or the play is covered by at least one sealing element that reduce the play to a size small enough to prevent water and/or debris to enter the first casing.

Another embodiment of the invention relates to the kit defined hereinabove, further comprising a sealing element is made of flexible elastomeric material, and adapted to be secured to the front guard. Preferably, the elastomeric material can be fastened to the first part and/or the second part by any appropriate fastening means, such as mechanical fasteners, adhesive, etc.

Another embodiment of the invention relates to the kit defined hereinabove, wherein the front guard comprises:
- a first part provided with a front edge having at least one first recess,
- a second part provided with a rear edge having at least one second recess,
- the at least one first recess and the at least one second recess are adapted to form, when the front edge and the rear edge are closed to each other, the at least one opening adapted to surround the shaft element of the at least one auger; and
- wherein the front edge and the rear edge are close enough to define a play therebetween that is either small enough to prevent water and or debris to enter the first casing, or filled with a filling element and/or covered with a sealing element secured to any one of the first part or the second part to have the play small enough to prevent water and/or debris to enter the first casing.

Another embodiment of the invention relates to the kit defined hereinabove, wherein the sealing element between the first part and the second part is made of a flexible elastomeric material. element between the first part and the second part is made of a flexible elastomeric material. Preferably, the elastomeric material can be fastened to the first part and/or the second part by any appropriate fastening means, such as mechanical fasteners, adhesive, etc.

Another embodiment of the invention relates to the kit defined hereinabove, wherein the rear guard comprises at least two distinct parts, that is a main part and secondary part that can be removably fastened to the main part. Preferably, the secondary part is removably fastened to the main part with at least one two-part fastener, such as for example a two-part fastener comprising a tongue and a notch. More preferably, a plurality of two-part fasteners can be used. Additionally, at least one of the two-part fastener may be further provided with a lock system.

Another embodiment of the invention relates to a method for the installation of a driving system as defined hereinabove on the snow removal device, the method comprising the steps of:
 rotatably mounting on the frame or the auger housing the at least one driving gear adapted to be rotatably supported by the frame or the auger housing;
 mounting the at least one output gear adapted to be mounted on the shaft element of the at least one auger;
 installing the roller chain to link the at least one driving gear and the at least one output gear;
 installing the at least one means for the tensioning the roller chain;
 removably securing the first guard to the first lateral wall to form with the first lateral wall the first casing to prevent snow or debris contained in the auger housing to contact said first portion;
 removably securing to the frame the second guard to cover the second portion and to prevent snow or debris present around the snow removing device to contact the said second portion; and
 optionally providing a third opening in the auger housing;
 a first portion of the driving system for driving the auger being positioned within the auger housing and a second portion of the driving system for driving the auger being positioned outside the auger housing,
 the roller chain being adapted to be moved across the third opening of the auger housing.

Another embodiment of the invention relates to the method defined hereinabove, wherein the snow removing device is a snow blower further provided with a blower unit comprising an impeller fan element positioned inside a blower housing, and rotatably supported by the blower housing; and a driving system for driving the impeller fan element.

Another embodiment of the invention relates to the method defined hereinabove, wherein the self-adjusting chain tensioner comprises at least one Roll-Ring® chain tensioner.

Another embodiment of the invention relates to the method defined hereinabove, wherein the at least one means for the tensioning the roller chain further comprises a secondary chain tensioner.

Another embodiment of the invention relates to the method defined hereinabove, further comprising a step of securing a filling element comprising a two-part member around the portion of the shaft element of the at least one auger that is intended to be positioned in the at least one opening of the front guard,
 wherein said filling element has a central opening configured to fit an outer surface of the shaft element of the at least one auger, and an outer periphery adapted to be housed in the at least one opening of the front guard; and
 wherein either a play between said outer surface and the periphery of the at least one opening of the guard cover, is small enough to prevent water and/or debris to enter the first casing, or optionally the step of securing at least one sealing element to cover the play and reduce the play to a size small enough to prevent water and/or debris to enter the first casing.

Another embodiment of the invention relates to the method defined hereinabove, further comprising a step of securing to the front guard a sealing element made of flexible elastomeric material. Preferably, the elastomeric material can be fastened to the first part and/or the second part by any appropriate fastening means, such as mechanical fasteners, adhesive, etc.

Another embodiment of the invention relates to the method defined hereinabove, wherein the front guard comprises:
 a first part provided with a front edge having at least one first recess,
 a second part provided with a rear edge having at least one second recess,
 wherein the method further comprises the step of positioning the at least one first recess and the at least one second recess to form the at least one opening adapted to surround the shaft element of the at least one auger; and
 wherein the method further comprises the step of positioning the front edge and the rear edge are close enough to define a play therebetween that is either small enough to prevent water and or debris to enter the first casing, or securing a sealing element to any one of the first part or the second part to have the play small enough to prevent water and/or debris to enter the first casing.

Another embodiment of the invention relates to the method defined hereinabove, wherein the sealing element between the first part and the second part is made of a flexible elastomeric material. Preferably, the elastomeric material can be fastened to the first part and/or the second part by any appropriate fastening means, such as mechanical fasteners, adhesive, etc.

Another embodiment of the invention relates to the method defined hereinabove, wherein the rear guard comprises at least two distinct parts, that is a main part and secondary part that can be removably fastened to the main part. Preferably, the secondary part is removably fastened to the main part with at least one two-part fastener, such as for example a two-part fastener comprising a tongue and a notch. More preferably, a plurality of two-part fasteners can be used. Additionally, at least one of the two-part fastener may be further provided with a lock system.

The invention also relates to a method for the manufacture of components and/or parts of the driving system. More particularly, parts and of the front guard and parts and of the rear guard can be manufactured by any appropriate techniques, especially by folding, cutting or molding a piece of material, preferably by folding and cutting sheets of metal, preferably sheets of steel and more preferably stainless steel.

The objects, advantages, and other features of the present invention will become more apparent in the light of the following non-limitative description of preferred embodiments of the invention, illustrated in the enclosed drawings, and given only as possible examples.

DESCRIPTION OF POSSIBLE AND/OR PREFERRED EMBODIMENTS OF THE INVENTION

Figure 1:
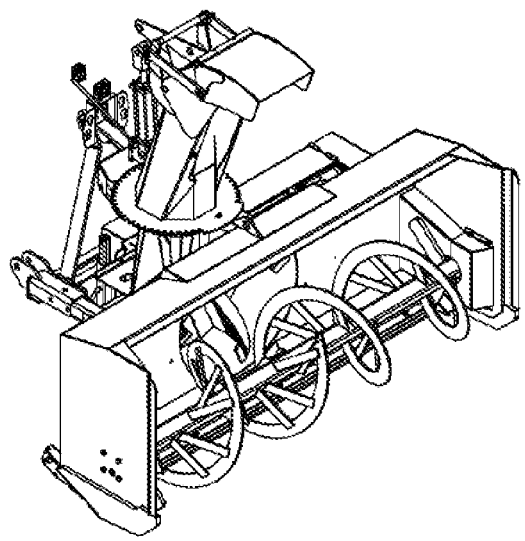
FIGS. 1 to 12, 30 and 31 represent various views, components and/or features according to the prior art.
Figure 2:
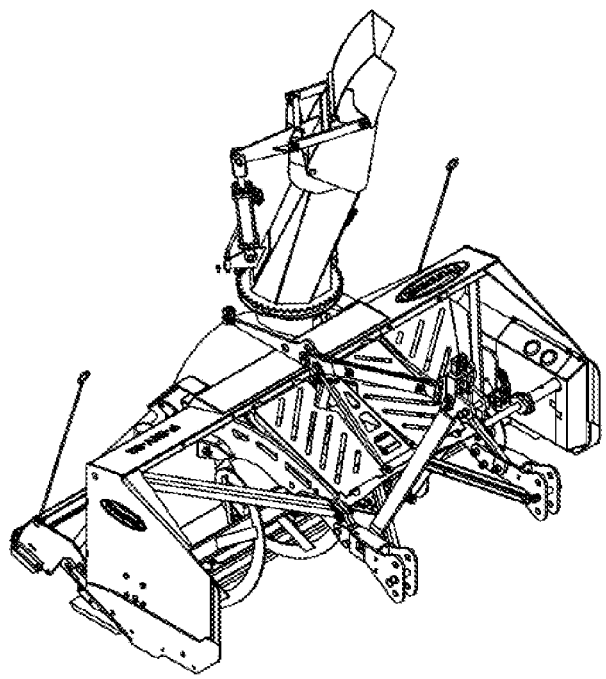
Figure 3:
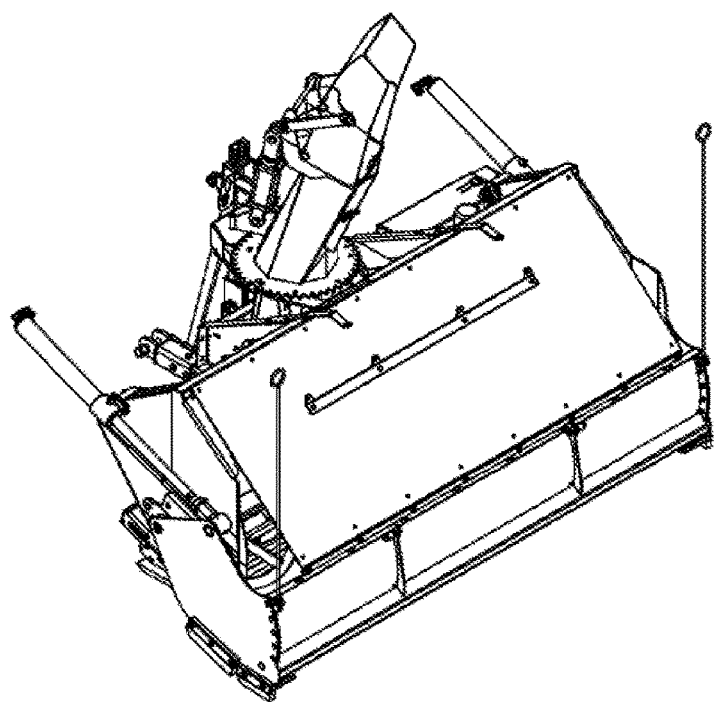
Figure 4:
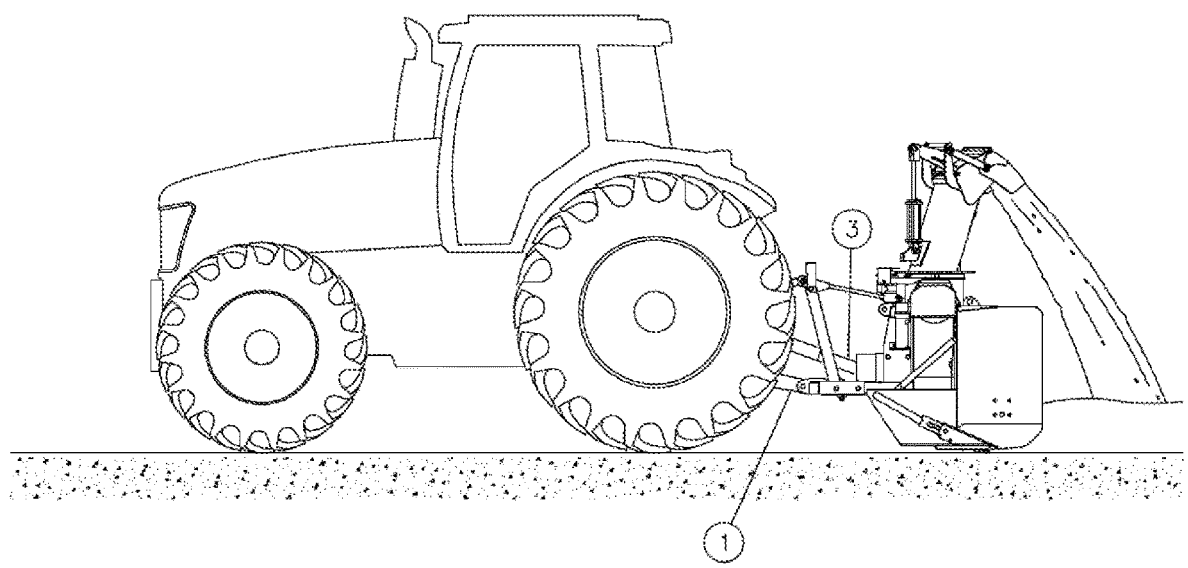
Figure 5:
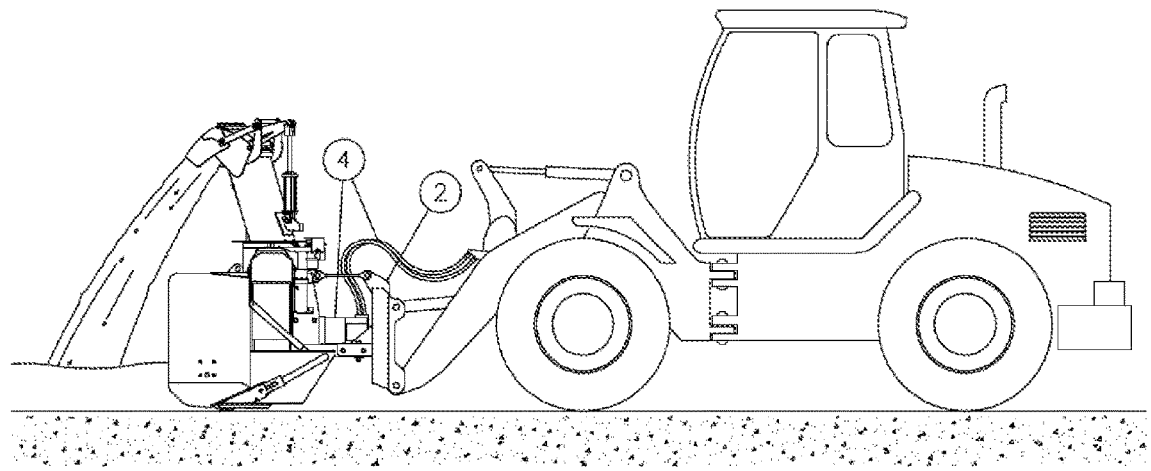
Figure 6:
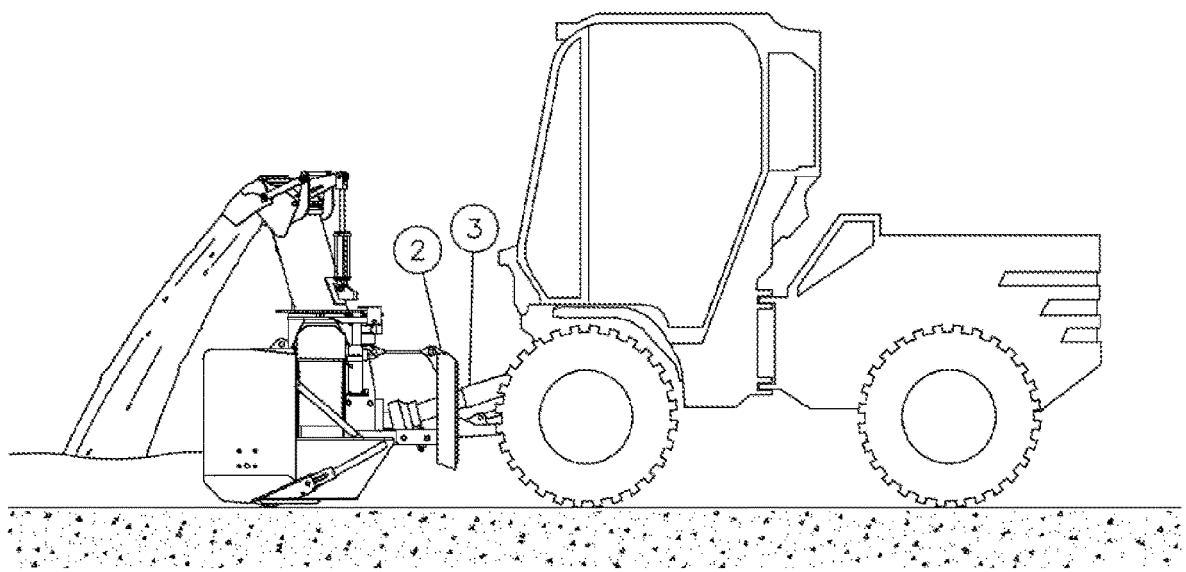

Various embodiments are described in the following disclosure with reference to the accompanying figures. It should be understood that elements of these figures are not necessarily depicted to scale, since emphasis is placed upon clearly illustrating the elements and structures of the present embodiments.

In the following description, same numerical references refer to similar elements. Furthermore, for the sake of simplicity and clarity, namely so as to not unduly burden the figures with several reference numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Also, as will be explained below in relation to various embodiments, the invention relates to driving systems for driving auger(s), snow removal devices provided with the driving systems, kits provided with components and/or parts of the driving systems, methods for the installations of said driving systems, and methods for the manufacture of some components and/or parts of the driving system, and in particular with respect to snow blowers. However, the invention can be used in any other suitable activities that would be obvious to persons skilled in the art.

Expressions such as «snow removal», «snow», «blower», «auger», etc., as used in the present description, and/or other references or expressions which are equivalent or similar to the above-mentioned expressions, do not have to be considered as limiting the scope of the present invention and include all other object/substitute and/or other application according to which the present invention can be used or may be useful, as it would be obvious to a person skilled in the art.

Moreover, the expressions such as «system», «blower», «vehicle», «device», «set», «mechanism», «product», «equipment», etc. as well as any other equivalent expressions and/or words comprising them, can be used in an interchangeable manner in the context of the present description. This also applies to any other expressions which are mutually equivalent, such as «component», «tool», and «accessory», as an example, as well as «snow» and «material», or a «front» and «upstream», or «rear» and «downstream», as it would be obvious to a person skilled in the art.

Moreover, even if illustrated preferred embodiments comprise several parts and/or components, all these parts and/or components are not necessarily essential for the invention and consequently do not have to be taken in their restrictive sense, i.e. should not be taken as to limit the scope of the present invention. It is to be understood that other suitable parts and/or components and cooperation thereinbetween, as well as other suitable geometrical configurations may be used without departing from the scope of the disclosure.

Moreover, in the context of the present description, it should be considered that all elongated objects implicitly have a «longitudinal axis» and/or «a center line», such as the longitudinal axis of a rod, as an example, or the center line of a cylindrical drum, and that the expressions such as «connected» and «adapted to be connected», or «pivoting» and «adapted to be pivoted», can be interchanged and are mutually equivalent, and that the present invention also relates to a kit having corresponding parts and/or components to assembled to provide a resulting snow blower which is operational when fully assembled to achieve a method and/or obtain any resulting product and/or derivate.

Furthermore, certain components of the present system and/or steps of the present method (e.g. for the manufacturing, the assembly, the operation, etc.) described in the present specification can be modified, simplified, omitted and/or interchanged, without departing from the scope of the present invention, independently of particular applications for which the present system is conceived and/or intended for.

Generally, the present invention, as illustrated in the enclosed drawings, relates to a new driving system for driving at least one auger of a snow blower.

More particularly, the present invention relates to a driving system related to an original configuration of various parts and/or components of a snow blower allowing to transfer the power from a gear box to an auger, and also relates to a snow blower provided with such a system. Also, the present invention relates to snow blowers provided with such a system, vehicles allowing to operate such snow blowers, a method for the manufacturing and assembly of these pieces, etc. More particularly, the present invention also relates to a kit having parts and/or components intended for the assembly and/or embodying the present driving system, as well as methods for the corresponding assembly, the operation and uses. Also, the invention relates to a method for the manufacturing of some components and/or parts of the driving system.

In the light of the following paragraphs, referring to the enclosed drawings, it will be better understood how the above-mentioned advantages are associated to the novel features of the invention.

Figure 30:
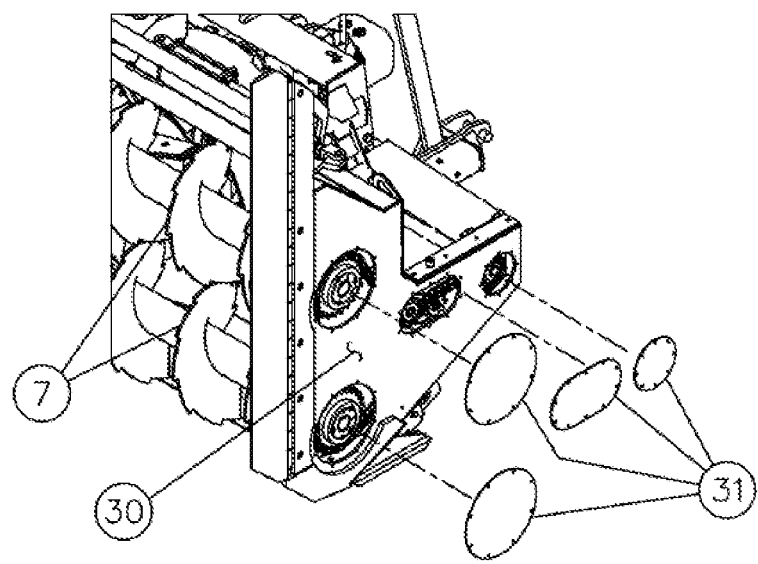
Figure 31:
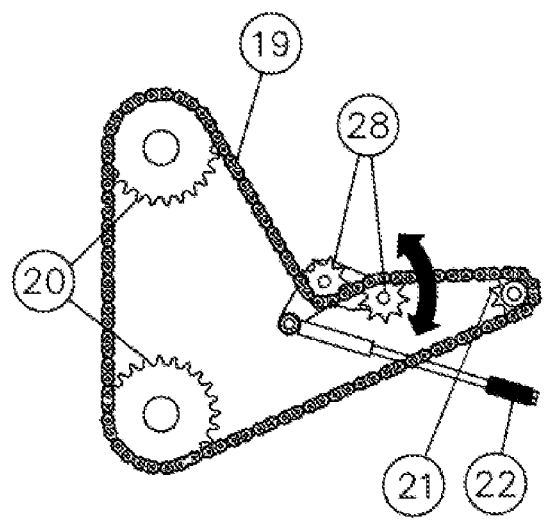

More particularly, to overcome the problems existing with above-mentioned conventional systems, it would be possible to use a sealed guard 31 (see FIGS. 30 and 31, as an example) provided with an oil bath 30 that would be compatible with the use of the «Roll-Ring» 29 and that would completely protect said «Roll-Ring» 29 from debris. The Applicant already used this concept with the «Roll-Ring» 29 in applications other that those related to the driving system for driving an auger 7, as an example, for chain boxes useful for the main driving of a snow blower with various ratios. The oil bath 30, 31 is also a concept that is widely used in the field of industrial snow blowers for the driving of the auger 7 frequently with the principle of a tandem tensioner 28 as described hereinbefore.

Figure 7:
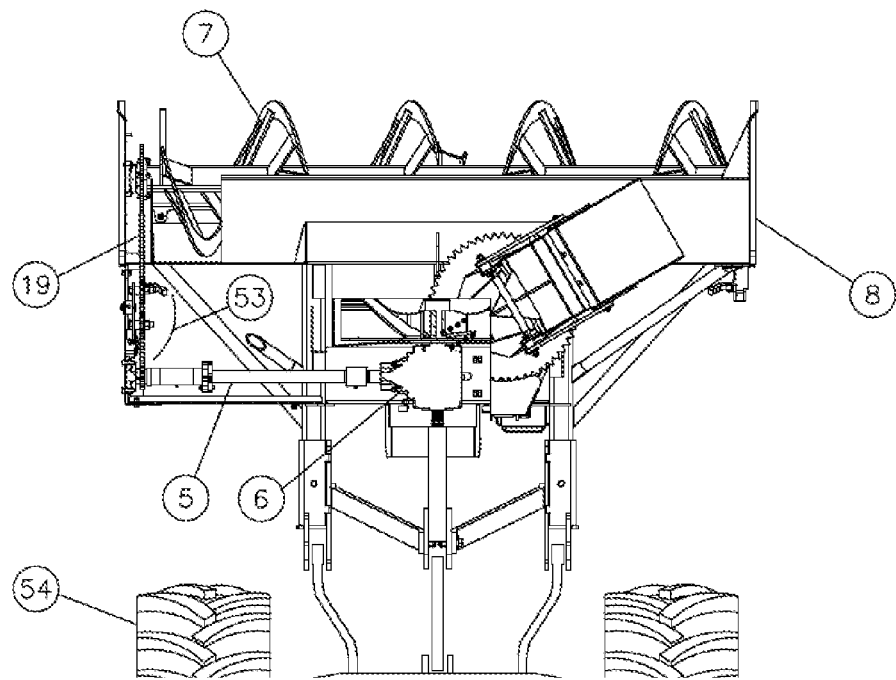
Figure 8:
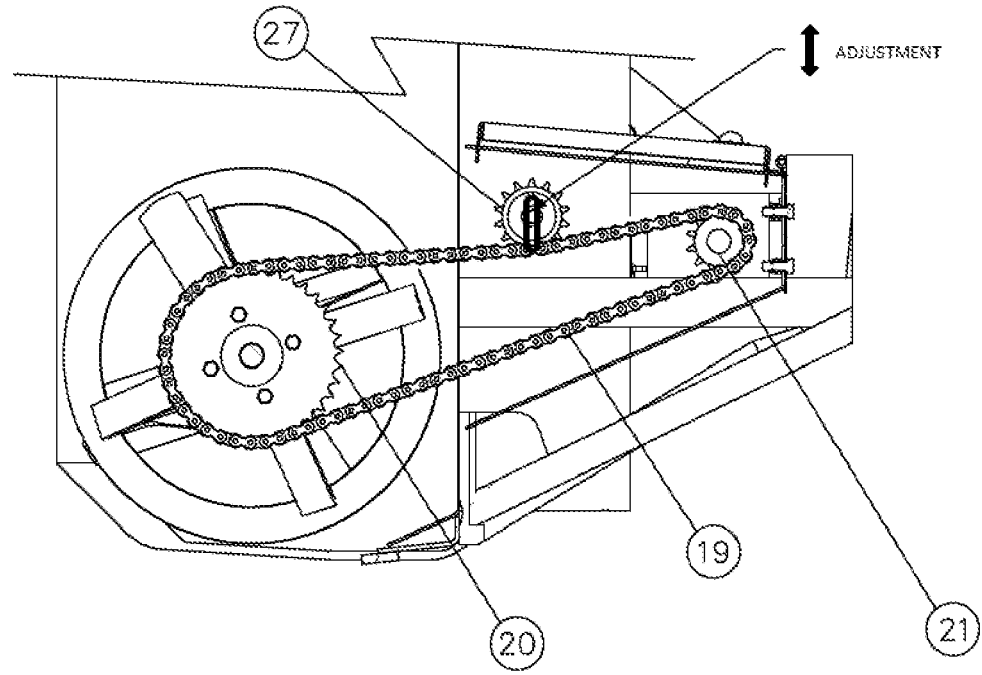
Figure 9:
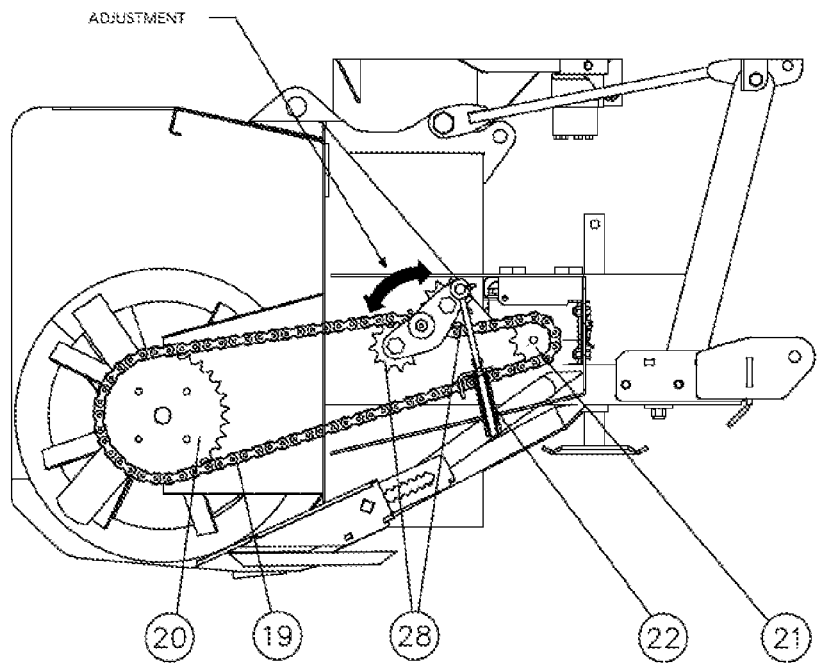
Figure 10:
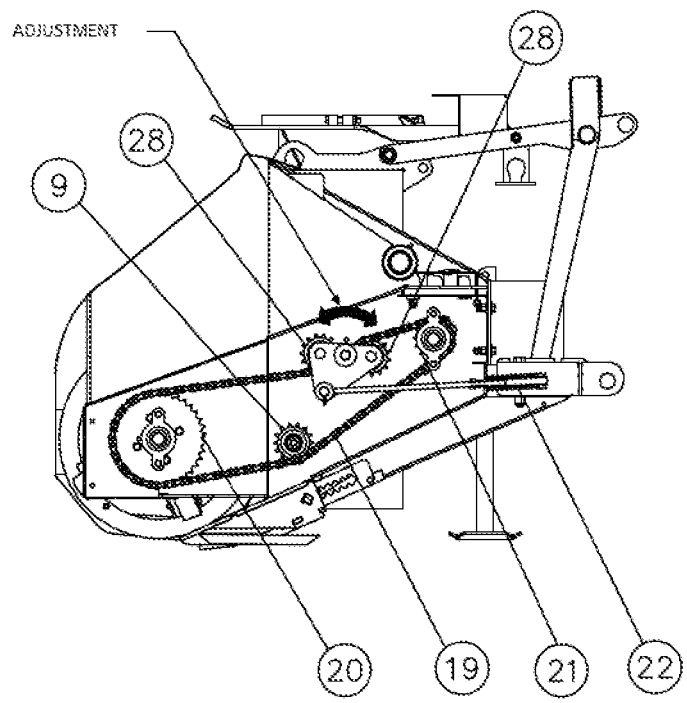
Figure 11:
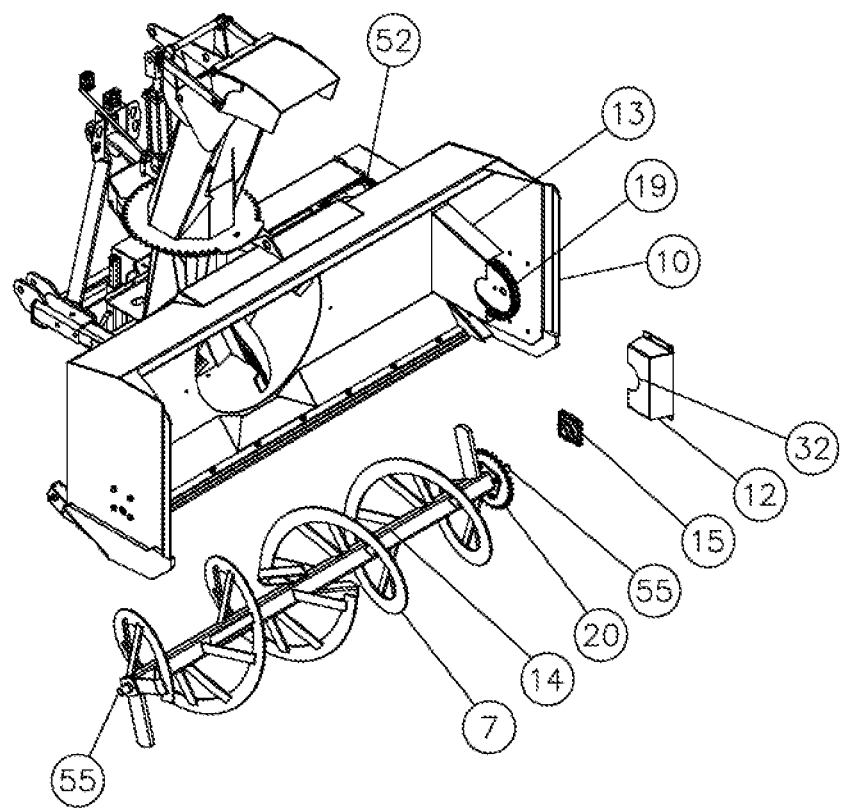
Figure 12:
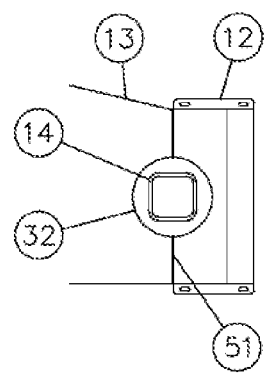

However, the high costs of oil bath 30, 31 is not compatible with commercial and/or domestic snow blowers. On commercial and/or domestic snow blowers, the roller chain 19 is protected with minimal front guard (especially provided with parts 12 and 13) and a rear guard 52 that protect the roller chain 19 from big objects on most of locations of the roller chain 19 but always provide an easy access via an opening provided in the rear guard 52 (see FIG. 11 as an example) and/or the area 53 (see FIG. 7, as an example), for the adjustment of the tensioner 29 and/or the lubrication of the roller chain 19 and/or mobiles parts and/or components of the tensioner 29. The opening further defines a free space further allows to evacuate ice debris or snow and the stiffness of the concept of actual tensioners, which do not necessitate closed environment, was up to now suitable to meet with for basic needs.

The Applicant has surprisingly discovered that is it is possible to use of a «Roll-Ring» combined with a low cost sealed guard system, in order to obtain a major advance concerning the quality of domestic or commercial snow removal devices, preferably blowers. The proposed new driving system according to the invention allows an easy access to the roller chain 19 for its lubrication while protecting the «Roll-Ring» 29 from all debris that would make the same derailed, without significative increase of the manufacturing costs of a domestic or commercial snow blowers.

The first zone to protect is located at the front of the auger housing 10 (see FIG. 11 as an example), at the inside of a side of the auger housing 10, at the left or the right of the auger 7. In most of cases, the front guard has two parts defined by a first part 12 and a second part 13, for accessing the shaft element 55 defining an axis of the auger 7 in order to assemble or disassemble the bearing 15 which maintain the auger 7 in place and for installing the roller-chain 19 on the output gear 20 of the auger 7.

According to the prior art, the joint 51 between the first part 12 of front guard and the second part 13 of the front guard has a play of about more or less ⅟₃₂ of an inch (i.e. more or less one millimeter), and this is not sufficient to prevent powder snow to infiltration. In order to improve the joint 51, the use of modern cutting and folding equipments allow obtaining a play of about 0.005 inch or less and this is surprisingly sufficient to improve the joint between the first part 12 of front guard and the second part 13 of the front guard to prevent powder snow infiltration. Alternatively, a rubber joint may be used to improve the sealing of the static joint 51.

Figure 13:
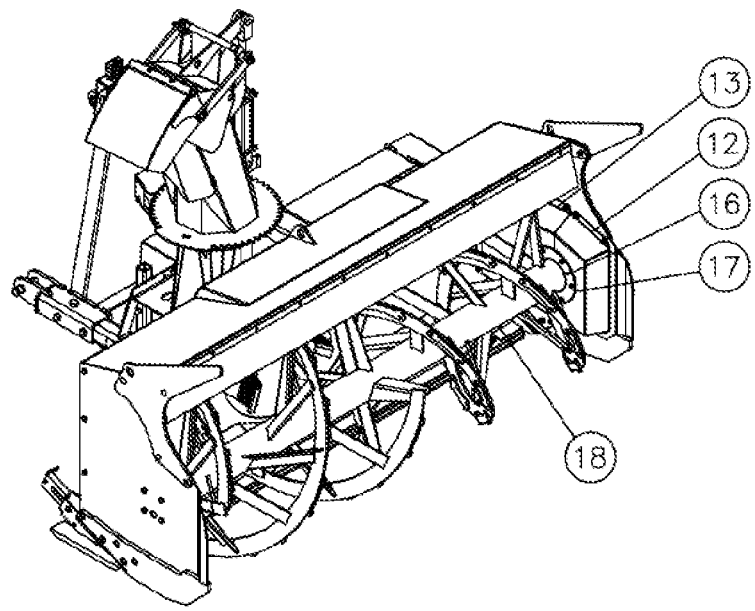
FIGS. 13 to 29 represent various views, components and/or features of possible embodiments of the present invention.
Figure 14:
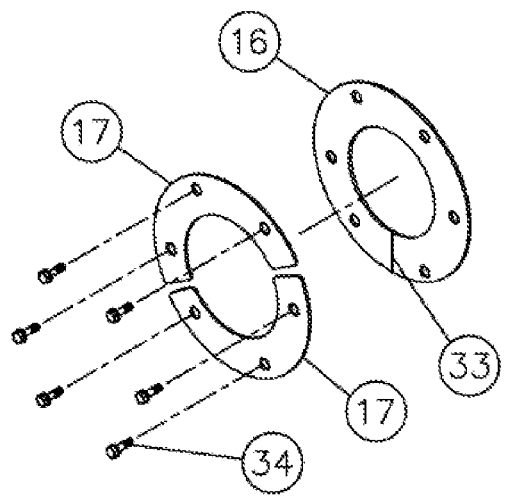

The shaft element 55 which may be provided with a circular cross section 18 (see FIG. 13 as an example) or a square cross section 14 (see FIG. 11 as an example), defines the main frame of the auger 7 in its axis, and passes across the first part 12 of the front guard and the second part 13 of the front guard, to connect the shaft element 55 of the auger 7 in bearings 15 secured by any appropriate fastening means, such as for example bolts and/or screws, preferably bolts, to the lateral wall of the auger housing 10.

According to the prior art (see FIG. 11 as an example), the half-moon opening 32 of the first part 12 of the front guard and the second part 13 of the front guard are larger than the cross-section of the shaft element 55 in order to have a play that will prevent friction of the shaft element 55 with the first part 12 of the front guard and the second part 13 of the front guard (13) when turning. The play between the shaft element 55 and the half-moon opening 32 is of about 0.25 to 0.5 inch (about 6 to 12 millimeters), and is obviously to large to block the powder snow.

According to preferential methods according to the present invention, two methods can be selected, depending the cross section of the shaft element 55 is a circle 18 or a square 14.

For the auger 7 provided with a shaft element 55 having a circular cross-section 18, a rubber, circular sealing joint 16 or any other flexible material, comprising or not a reinforcing fabric and able to be in contact with the corresponding cylindrical surface 18 of the shaft element 55 that rotates, without generating noise and being sufficiently sealable to stop powder snow. This circular sealing joint 16 does not have to necessarily apply a pressure on the corresponding cylindrical surface 18 of the shaft element 55.

In order that this circular sealing joint 16 can be easily assembled or disassembled, the circular sealing joint 16 may be provided with a slit 33 extending from the inside to the outside, perpendicularly on not to the circle or alternatively, may be made of two distinct parts which once assembled, perfectly fit together. This circular sealing joint may be fastened by any appropriate fastening means, such as bolts or screws, preferably bolts, to the first part 12 of the front guard and the second part 13 of the front guard ((see FIG. 13 as an example) in order to prevent its rotation. To obtain a good support and sealing between the circular, sealing joint 16 and the first part 12 of the front guard and the second part 13 of the front guard, two half-moon metallic pieces 17 may be required and/or advantageously provided for certain models of snow blowers. The circular sealing joint 16 and eventually parts 17 may be fastened to the front guard with any type of fasteners, such as mechanical fasteners, adhesive, etc., preferably with bolts 34.

Figure 15:
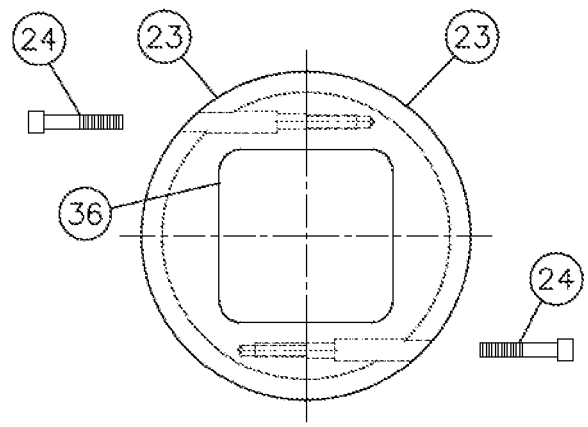
Figure 16:
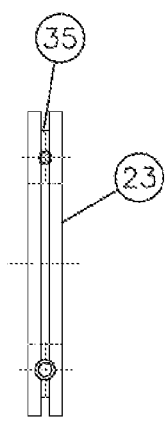
Figure 17:
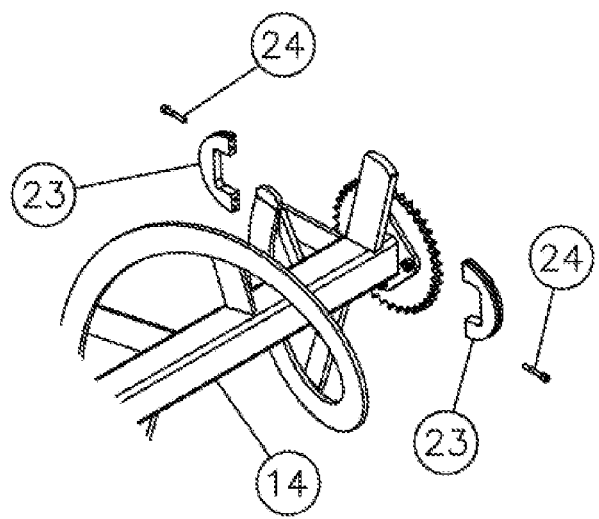

For the auger 7 having a shaft element 55 having a square cross-section 14 (see FIG. 15 as an example), two haft-moon parts 23) made of plastic material or any other material sufficiently resistant to cold temperature and impacts, are added to the shaft element 55, to form when facing one to the other, a resulting filling element having an exterior form defining a cylindrical surface provided with a groove 35 in its center over all the circumference, and an inner shape 36 that is coincident for each part 23 to one half of the shaft element 55 having a square cross-section.

Mechanical fastener, such as bolts 24 can be used to joint these parts together, the joint connecting these two parts being positioned at the center of two of the four flats portions of a square tube defining the shaft element 55 of the auger 7, opposed to each other. The openings for the bolts 24 are aligned on the center of the circumference and on one of both openings. An undercutting may be provided to completely house the head of the bolt 24 under the groove 35. The groove 35 of both pieces 23 are aligned on the second part 13 of the front and the bolts 24 are tightened in place. Then, the first part 12 of the front guard will be fastened by any appropriate fastening means, such as mechanical fastener, adhesive, preferably bolted with bolts on the lateral wall of the auger housing 10, applied against the second part 13 of the front guard, to thus complete the tight closure to snow or other debris around the shaft element 55 of the auger 7 having a square cross-section 14.

Two others non-preferential methods can be used to seal with shaft element 55 of the auger 7 having a square cross-section, are described hereinbelow.

Figure 21:
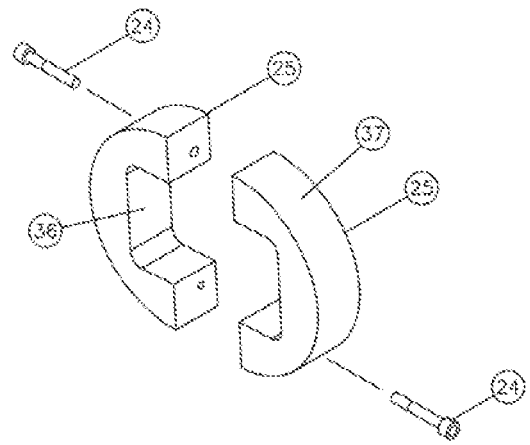

The first, in order to seat the sealing joint 16 described hereinbefore (see FIG. 13 as an example) for the shaft element 55 having a circular cross section 18, two half-moon parts 25 made of plastic or any other material that is sufficiently resistant to cold temperature or impacts (see FIG. 21 as an example), are added to the shaft element 55 having a square cross-section 14, in two parts, with an outer shape cylindrical 37 and devoided of a groove, and an inner shape «coincident» with one half of the shaft element 55 of the auger 7 having a square cross section 36, these parts being facing to each other. In order to join theses parts 25 with two bolts 24, the joint connecting the two parts are positioned at the center of two of the four flat of the shaft element 55 having a square cross-section 14 opposite to each other. The openings for the bolts 24 are positioned to avoid the first part 12 of the front guard and the second part 13 of the front guard and the circular sealing joint 16.

Figure 22:
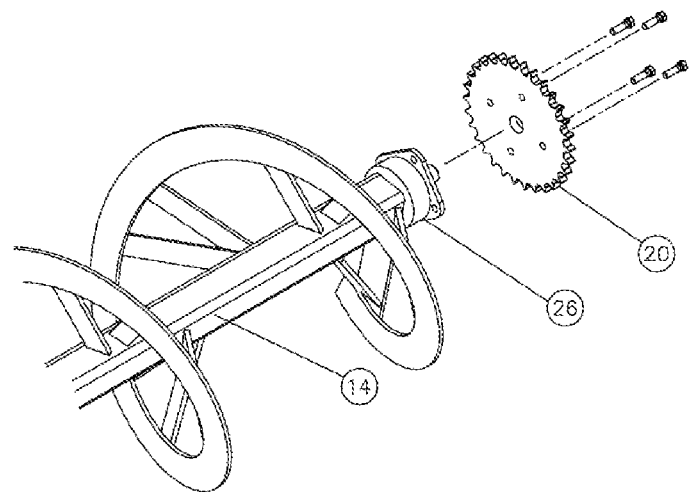
Figure 23:
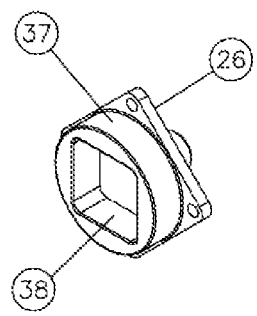
Figure 24:
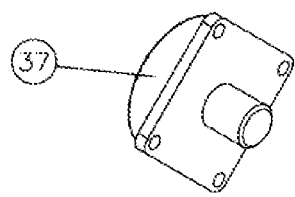

The second, (see FIG. 22 as an example), in order to seat the sealing joint 16 described hereinabove, a piece of metal 26 having the same characteristics that the shaft element of the auger 7) is fastened, preferably welded, at the end of the shaft element 55 with in addition, a cylindrical collar 37 on its exterior and square in its interior 38, in the same axis that the shaft element 55 having a square cross section 14, preferably manufactured from the piece of metal defining the shaft element 55. This piece is more compact and stiff that preceding solutions, but necessitate obtaining a more onerous piece to manufacture, thus applicable to models having a slightly higher quality.

Figure 25:
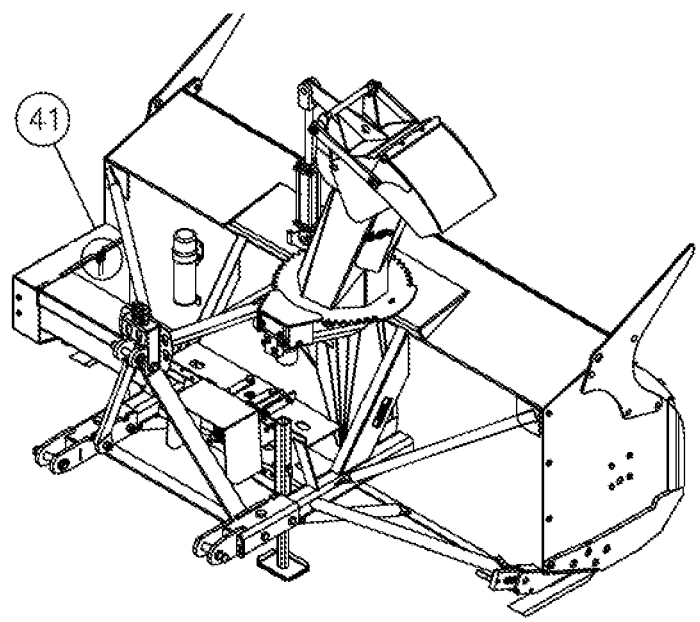
Figure 26:
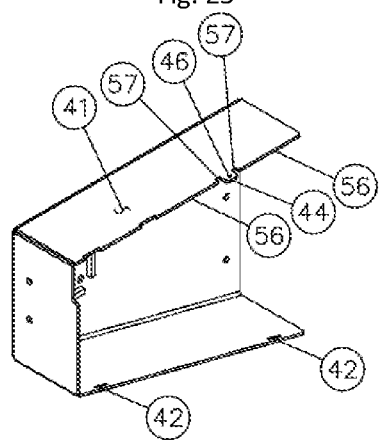
Figure 27:
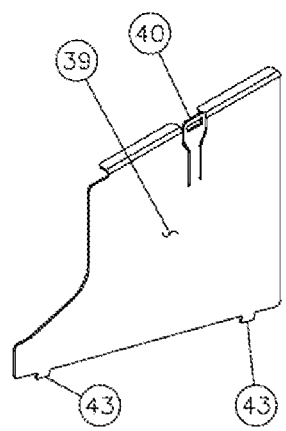
Figure 28:
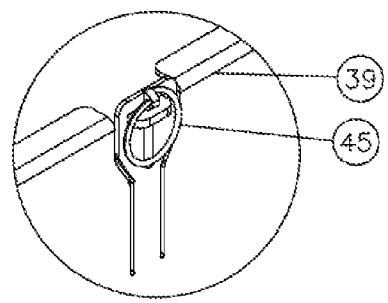
Figure 29:
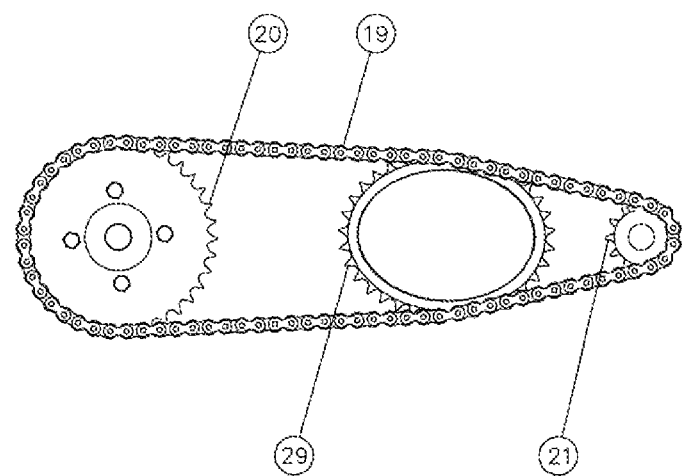

At the rear of the snow blower (see FIG. 25 as an example), the exposure to snow and other debris is less intense, and thus necessitate a lower degree of clogging. However, the most important contaminants originate from the wheels 54 of the carrying vehicle (see FIG. 7 as an example) which while moving on the road, project sands, salts, de-icing products or mud (e.g. a mixture of salt and/or wetted sand and snow). To sufficiently seal this part, the rear guard comprises at least two-parts, that is a main part 41 may be provided with a minimal but easily dismountable second part 39 to allow an easy access to the roller chain 19 and to the «Roll-Ring» 29. To allow a quick installation/deinstallation of this part 39 of the rear guard 41, two positioning notches 42 are added at the base of the actual rear guard 41 in order to insert therein two tongues 43 making part of the part 39, with a sufficient play to allow to freely incline this part 39 from the left to the right. According to this way, a visual and quick access is possible. If it becomes necessary to completely remove the part 39, it is only necessary to lift the part 39 to remove the tongues 43 from the notches 42.

To maintain the upper portion of the part 39 and secure it into an operational way, a system comprising a flexible tongue 40 cut out in the upper portion of the part 39 cooperating with a notch allowing to pass therethrough a rigid tongue 44 cut out from the existing rear guard 41, provided with a support on each side 56 and with a clearance 57 vis-à-vis the underneath of the tongue 40 of the part 39 in order to clear a necessary space allowing the tongue 40 of the part 39 to bent until liberating the opening 46 positioned slightly under the natural surface of the part 39. While releasing the tongue 40 of the part 39, the tongue comes contacting the pin 45 and creates a tension by the natural resistance of the metal and accordingly the pin 45 and the part 39 are always under tension to avoid vibration noise that may impair the operator and the resident of the sector where the snow blower is operating.

Inside this semi-sealed environment of economical manufacture, the use of a «Roll-Ring» 29 becomes possible in replacement of all other tensioning systems. However, in some cases, the tension of a «Roll-Ring» 29 may be insufficient to cover a large range of tension adjustments, especially when the length of the roller chain is important. Because the distance between the output gear 20 of the shaft element 55 and the driving gear 21 connected to a driving shaft 5 (see FIG. 7 as an example) may vary slightly from an equipment to another and because the roller chain 19 may become worn and elongated at a certain speed, the sole installation of a «Roll-Ring» 19 may be insufficient to cover the whole range of elongation of the rolled-chain 19. Old systems (see FIGS. 8, 9, 10, 30 and 31, as an example) cover sufficient ranges to adjust the roller chain 19 to the removal of a complete link when possible. The adjustment range of old systems cover more that the equivalent of one complete link.

Figure 18:
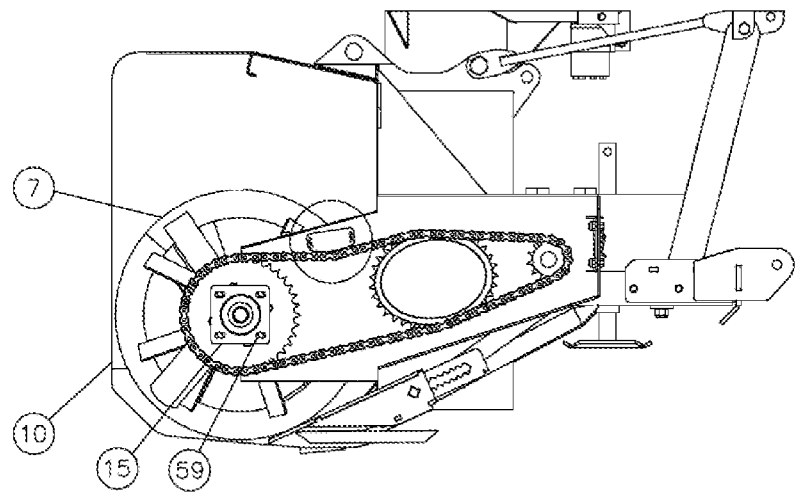
Figure 19:
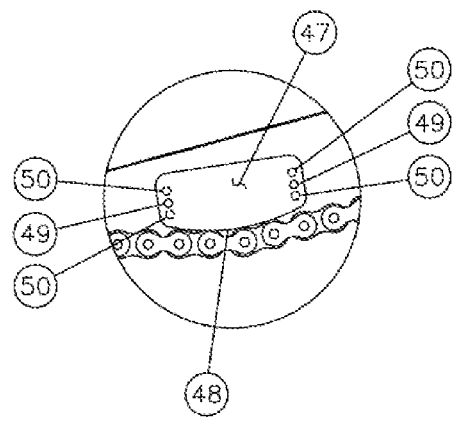
Figure 20:
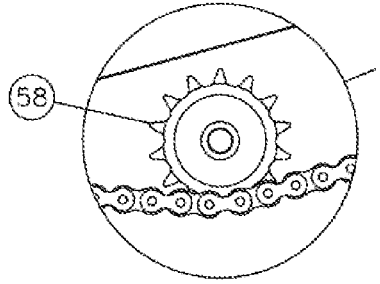

To overcome this problem, a chain diverter system 47 (see FIG. 18 as an example) adjustable with tools may be added to reposition the path of the roller chain 19 proportionally to its wear by providing a sufficient degree of movement to allow an adjustment of the roll chain of a complete link.

According to a preferential embodiment of the present invention (see FIG. 18 as an example), the use of block provided made from a material having a low resistance to friction, or provided with a coating or an insert of a material having a low resistance to friction, preferably a Teflon® block 47) is preferred. This block 47 comprises a curve 48 adapted to the size of the roller chain 19 to offer a smooth contact of the links of the roller chain 19. The block 47 is provided with two openings 49 that may be aligned with a set of openings 50 provided in the frame and/or the auger housing of the snow blower, and positioned according to a ladder. These openings 49 are positioned at the center of the block 47 and the block 47 is sized in such a way to always cover the openings positioned along the ladder containing openings 50 provided in the frame or the lateral wall of the auger housing. According to this way, the block 47 will block openings 50 and prevent the snow to reach the roller chain 19, the «Roll-Ring» 29, the output gear 20 and the driving gear 21.

It is understood that the replacement of the block 47 (see FIG. 18, as an example) by a free sprocket wheel 58, turning on a ball bearing may be a good deviation solution. Also, in certain other cases, an adjustment with oblong openings 59 provided in the lateral wall of the auger housing, may allow to move the shaft element 55 of the auger 7 from the front to the rear, may be sufficient to compensate the length of the roller chain 19 of a chain link. In this later case, an adjustment with oblong openings on the first part 12 of the front guard and the second part 13 of the front guard will be necessary to allow the displacement of the sealing joint simultaneously with the shaft element 55 of the auger 7. Also, in this case, the auger 7 would further comprise tensioners that will hold the auger 7 in place once adjusted because violent impacts may move the auger 7 backwardly and distort the adjustment. It may be understood that this last option is not preferential.

The invention also relates to a method for the installation of a driving system as on the snow removal device. The method comprises the steps of:
  rotatably mounting on the frame or the auger housing 10 the driving gear 21 adapted to be rotatably supported by the frame or the auger housing 10;
  mounting the at least one output gear adapted to be mounted on the shaft element 55 of the auger 7;
  installing the roller chain 19 to link the driving gear 21 and the output gear 20;
  installing the Roll-Ring 29;
  removably securing the front guard to the first lateral wall to form with the first lateral wall the first casing to prevent snow or debris contained in the auger housing to contact said first portion;
  removably securing to the frame the rear guard to cover the second portion and to prevent snow or debris present around the snow removing device to contact the said second portion; and
  optionally providing a third opening in the auger housing;
  a first portion of the driving system for driving the auger 7 being positioned within the auger housing 10 and a second portion of the driving system for driving the auger 7 being positioned outside the auger housing 10, the roller chain 19 being adapted to be moved across the third opening of the auger housing 10.

The invention also relates to a method for the manufacture of components and/or parts of the driving system. More particularly, parts 12, 13, 16, 17 and 23 of the front guard and parts 39 and 41 of the rear guard can be manufactured by any appropriate techniques, especially by folding, cutting or molding a piece of material, preferably by folding and cutting sheets of metal, preferably sheets of steel and more preferably stainless steel.

Finally, according to the present invention, the snow blower and its corresponding parts and/or components are preferably made of substantially rigid material, such as metallic materials (e.g. steel, stainless steel, etc.), hardened polymer, composite materials, and/or any other appropriate materials, while other parts and/or components of the system according to the invention, in order to obtain the above-mentioned advantages, may be made of any appropriate materials, such as polymeric materials (e.g. plastic, rubber, etc.), and/or any other appropriate materials, depending of the particular uses for which the system is designed and of various parameters involved, as it would be obvious to a person skilled in the art.

Even if the present invention was hereinabove explained with reference to preferred embodiments, it is to be noted that any modification to these preferred embodiments is not considered modifying or altering the nature and the scope of the present invention. Indeed, all claims defined hereinafter, must receive the broadest interpretation that is conform to the whole description.

The invention claimed is:

1. A driving system for driving at least one auger of a snow removing device, said snow removing device comprising:
   a frame;
   an auger housing supported on the frame or being part of the frame, and comprising a first opening defining a front opening, a second opening defining a rear opening, a first lateral wall and a second lateral wall;
   an auger comprising a shaft element having opposite ends which are respectively rotatably supported by the first lateral wall and the second lateral wall;
   means adapted for attaching the frame to a vehicle; and
   the driving system for driving the at least one auger, said driving system for driving the at least one auger comprising:
      at least one driving gear rotatably supported by the frame;
      at least one output gear mounted on the shaft element of the at least one auger, close one of the first lateral wall of the auger housing;
      a roller chain linking the at least one driving gear and the at least one output gear; and
      at least one means for tensioning the roller chain comprising at least one self-adjusting chain tensioner;
   wherein a first portion of the driving system for driving the at least one auger is positioned within the auger housing and a second portion of the driving system for driving the at least one auger is positioned outside the auger housing;
   wherein the roller chain is adapted to move across a third opening provided in the auger housing;
   wherein the first portion is covered by a front guard secured to the first lateral wall and forming with the first lateral wall a first casing adapted to prevent snow or debris contained in the auger housing to contact said first portion;
   wherein the front guard is provided with at least one opening adapted to surround a portion of the shaft element of the at least one auger with a play between a periphery of the at least one opening and a periphery of a corresponding portion the corresponding shaft element;
   wherein the play is filled with a filling element and/or covered with a sealing element secured to the front guard or the corresponding portion of the shaft element of the at least one auger;
   wherein the second portion is covered by at least one rear guard forming a casing secured to the frame and/or the auger housing, and adapted to prevent snow or debris present around the snow removing device to contact the said second portion;
   wherein the front guard comprises:
      a first part provided with a front edge having at least one first recess;
      a second part provided with a rear edge having at least one second recess;
      the at least one first recess and the at least one second recess forming, when the front edge and the rear edge are closed to each other, the at least one opening adapted to surround the shaft element of the at least one auger;
   wherein the front edge and the rear edge are close enough to define a play therebetween that is small enough to prevent snow and/or debris to enter the first casing, or filled and/or covered with a sealing element secured to any one of the first part or the second part to have a play therebetween that is small enough to prevent snow and/or debris to enter the first casing;
   wherein the filing element comprises a two-part member secured around the portion of the shaft element of the at least one auger that is positioned in the at least one opening of the front guard;
   wherein said filling element has a central opening configured to fit with the outer surface of the shaft element of the at least one auger, and has an outer periphery housed in the at least one opening of the front guard and/or covering the at least one opening of the front guard;
   wherein a play between said outer surface and the periphery of the at least one opening of the front guard, is small enough to prevent snow and/or debris to enter the first casing; and
   wherein the at least one self-adjusting chain tensioner comprises at least one self-supported tensioning and damping element consisting of an elastically deformable ring provided with a toothed rim engaging the roller chain.

2. The driving system according to claim 1, wherein the snow removing device is a snow blower further provided with a blower unit comprising an impeller fan element positioned inside a blower housing, and rotatably supported by the blower housing; and a driving system for driving the impeller fan element.

3. The driving system according to claim 1, wherein the at least one means for tensioning the roller chain further comprises a secondary chain tensioner.

4. The driving system according to claim 1, wherein the rear guard comprises at least two distinct parts, that is a main part and secondary part that is removably fastened to the main part.

5. A snow removing device comprising:
   a frame;
   an auger housing supported on the frame and comprising a first opening defining a front opening, a second opening defining a rear opening, a first lateral wall and a second lateral wall;

at least one auger comprising a shaft element having opposite ends which are respectively rotatably supported by the first lateral wall and the second lateral wall; and a driving system for driving the at least one auger;

wherein said driving system for driving the auger comprises:
  at least one driving gear rotatably supported by the frame;
  at least one output gear mounted on the shaft element of the at least one auger, close one of the first lateral wall of the auger housing;
  a roller chain linking the at least one driving gear and the at least one output gear; and
  at least one means for tensioning the roller chain comprising at least one self-adjusting chain tensioner;

wherein a first portion of the driving system for driving the at least one auger is positioned within the auger housing and a second portion of the driving system for driving the at least one auger is positioned outside the auger housing;

wherein the roller chain is adapted to move across a third opening provided in the auger housing;

wherein the first portion is covered by a front guard secured to the first lateral wall and forming with the first lateral wall a first casing adapted to prevent snow or debris contained in the auger housing to contact said first portion;

wherein the front guard is provided with at least one opening adapted to surround a portion of the shaft element of the at least one auger with a play between a periphery of the at least one opening and a periphery of a corresponding portion the corresponding shaft element;

wherein the play is filled with a filling element and/or covered with a sealing element secured to the front guard or the corresponding portion of the shaft element of the at least one auger;

wherein the second portion is covered by at least one rear guard forming a casing secured to the frame and/or the auger housing, and adapted to prevent snow or debris present around the snow removing device to contact the said second portion;

wherein the front guard comprises:
  a first part provided with a front edge having at least one first recess;
  a second part provided with a rear edge having at least one second recess;
  the at least one first recess and the at least one second recess forming, when the front edge and the rear edge are closed to each other, the at least one opening adapted to surround the shaft element of the at least one auger;

wherein the front edge and the rear edge are close enough to define a play therebetween that is small enough to prevent snow and/or debris to enter the first casing, or filled and/or covered with a sealing element secured to any one of the first part or the second part to have a play therebetween that is small enough to prevent snow and/or debris to enter the first casing;

wherein the filing element comprises a two-part member secured around the portion of the shaft element of the at least one auger that positioned in the at least one opening of the front guard;

wherein said filling element has a central opening configured to fit an outer surface of the shaft element of the at least one auger, and has outer cylindrical periphery housed in the at least one opening of the guard cover and/or covering the at least one opening of the first guard;

wherein a play between said outer surface and the periphery of the at least one opening of the guard cover, is small enough to prevent snow and/or debris to enter the first casing;

wherein the snow removing device is a snow blower further provided with a blower unit comprising an impeller fan element positioned inside a blower housing, and rotatably supported by the blower housing; and a driving system for driving the impeller fan element; and wherein the at least one self-adjusting chain tensioner comprises at least one self-supported tensioning and damping element consisting of an elastically deformable ring provided with a toothed rim engaging the roller chain.

6. The snow removing device according to claim 5, wherein the at least one means for tensioning the roller chain further comprises a secondary chain tensioner.

7. The snow removing device according to claim 5, wherein the rear guard comprises at least two distinct parts, that is a main part and secondary part that is removably fastened to the main part.

8. A kit for the installation of the driving system defined in claim 1, wherein said kit comprises:
  the at least one driving gear adapted to be rotatably supported by the frame and/or the auger housing;
  the at least one output gear adapted to be mounted on the shaft element of the at least one auger;
  the roller chain linking for the linking of the at least one driving gear and the at least one output gear;
  the at least one means for the tensioning the roller chain comprising the at least one self-adjusting chain tensioner;
  the front guard adapted to be secured to the first lateral wall to form with the first lateral wall the first casing to prevent snow or debris contained in the auger housing to contact said first portion;
  the rear guard adapted to be secured to the frame and/or the auger housing to prevent snow or debris present around the snow removing device to contact the said second portion;
  the filling element adapted to fit an outer surface of the shaft element and to be housed in the at least one opening of the front guard and/or to cover the at least one opening of the front guard; and
  optionally a notice of instructions;
  wherein the snow removing device is a snow blower further provided with a blower unit comprising an impeller fan element positioned inside a blower housing, and rotatably supported by the blower housing; and a driving system for driving the impeller fan element; and
  wherein the self-adjusting chain tensioner comprises at least one self-supported tensioning and damping element consisting of an elastically deformable ring provided with a toothed rim engaging the roller chain.

9. The kit system according to claim 8, wherein the at least one means for the tensioning the roller chain further comprises a secondary chain tensioner.

10. The driving system according to claim 8, wherein the rear guard comprises at least two distinct parts, that is a main part and secondary part that is removably fastened to the main part.

11. A method for the installation of the driving system defined in claim 1 on the snow removal device, the method comprising the steps of:
- rotatably mounting on the frame or the auger housing the at least one driving gear adapted to be rotatably supported by the frame or the auger housing;
- mounting the at least one output gear adapted to be mounted on the shaft element of the at least one auger;
- installing the roller chain to link the at least one driving gear and the at least one output gear;
- installing the at least one means for the tensioning the roller chain;
- removably securing the front guard to the first lateral wall to form with the first lateral wall the first casing to prevent snow or debris contained in the auger housing to contact said first portion;
- removably securing to the frame the rear guard to cover the second portion and to prevent snow or debris present around the snow removing device to contact the said second portion;
- removably securing the filling element to the outer surface of the shaft element and
  - housing said filling element in the at least one opening of the front guard, and/or
  - covering the at least one opening of the front guard with the filling element; and
- providing the third opening in the auger housing;
- the first portion of the driving system for driving the auger being positioned within the auger housing and the second portion of the driving system for driving the auger being positioned outside the auger housing, and
- the roller chain being adapted to be moved across the third opening of the auger housing.

12. The method according to claim 11, wherein the snow removing device is a snow blower further provided with a blower unit comprising an impeller fan element positioned inside a blower housing, and rotatably supported by the blower housing; and a driving system for driving the impeller fan element.

* * * * *